Feb. 13, 1951  G. A. LYON  2,541,079
WHEEL COVER
Filed Nov. 24, 1944
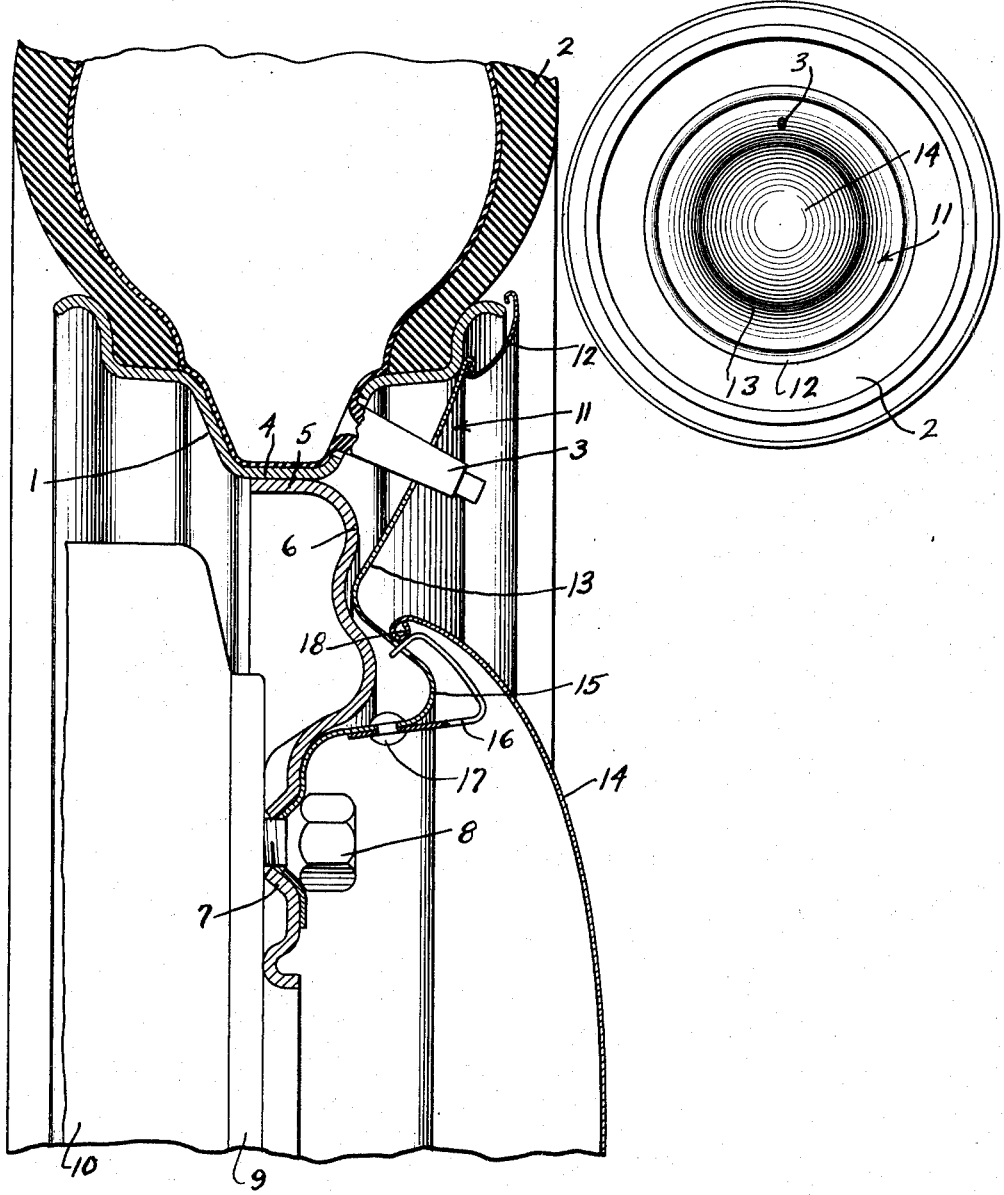
Inventor
GEORGE ALBERT LYON Patented Feb. 13, 1951

2,541,079

UNITED STATES PATENT OFFICE 2,541,079

WHEEL COVER

George Albert Lyon, Allenhurst, N. J.

Application November 24, 1944, Serial No. 564,971

3 Claims. (Cl. 301—37)

This invention relates to a wheel structure and more particularly to an ornamental cover for disposition over the outer side surface of a vehicle wheel.

In the past, where an ornamental disc-like cover has been used in connection with a vehicle wheel and secured to the wheel by means of bolts, clamps or the like, especially if such securement was adjacent the central portion of the wheel, extreme difficulty has been experienced in providing a construction that was not subject to rattling, squeaks or similar undesirable noises. Furthermore manufacturing tolerances were such as not to afford a close fit between such cover and wheel.

An object of this invention is to provide an improved wheel structure that is devoid of the above mentioned disadvantages of prior covered vehicle wheel structures.

A more specific object of this invention is to provide a novel, ornamental, disc-like cover for attachment to the central or nave part of a wheel in such a way as to cause the cover to be held under tension against the side of the wheel, at the same time tensioning the portion of the cover which is bolted to the wheel thus tending to prevent loosening of the bolts during usage of the vehicle.

A further object of this invention is to provide an improved and simplified structure for holding a multi-part cover structure on a wheel, which structure is rugged, economical to manufacture, and reliable in use.

A still further object of this invention is to provide a cover structure for a vehicle wheel that is adapted to form a tight fit with a rim portion of the wheel despite manufacturing tolerances allowed in mass production of wheel parts.

A more specific object of this invention is to provide an ornamental cover for a vehicle wheel which is so shaped as to facilitate centering thereof onto a correspondingly shaped portion of the body or load bearing portion of the wheel.

A further specific object of the present invention is to provide on a vehicle wheel cover a novel mounting structure for a plurality of spring elements for detachably holding a hub cap.

Other objects and features of this invention will more fully appear from the following detailed description taken in connection with the accompanying drawings which illustrate several embodiments thereof, and in which:

Figure 1 is a side view of a vehicle wheel including a cover structure embodying the features of the present invention; and Figure 2 is an enlarged fragmentary cross-sectional view of the structure shown in Figure 1.

In the illustrated form of my invention, numeral 1 designates generally a multi-flange, drop-center type of tire rim which is adapted to support, in the usual way, a pneumatic tire 2 equipped with the usual valve stem 3 extending through an aperture in one of the flanges of the tire rim.

A base flange 4 of the tire rim 1 is attached in any well known manner to the flange 5 of a central load bearing, or body part 6. The body part 6 is also referred to in the art as a nave part, hub or spider. Body part 6 has a central portion provided with a central fastening flange 7 which is offset inwardly towards the median plane of the wheel. This flange 7 is adapted to be secured by usual fastening bolts or cap screws 8 to a wheel axle part 9 associated with the brake drum 10. Body part 6 is preferably formed from a relatively heavy sheet material and is usually made from a metallic stamping, thus has a relatively unfinished outer surface. In the manufacture of such body or hub part on a large scale production basis, it is prohibitively expensive to provide the outer surface of the body or hub part with a finish that is satisfactory for an external or visible part of a vehicle wheel. A disc-like cover structure 11 is therefore provided and is adapted to be applied to the wheel to cover substantially the entire outer surface of the wheel.

The cover structure 11 comprises an outer ring part 12 secured to a central part 13, which, in turn, has secured thereto, in a readily detachable manner a hub cap 14. Hub cap 14, of course, covers the central or hub portion of the wheel. Parts 12, 13 and 14 may be of metal or plastic or a combination thereof. For example, body part 13 may be of metal or rigid synthetic plastic whereas ring part 12 may be of plastic or highly polished metal to give a pleasing ornamental effect. Since parts 12, 13 and 14 are relatively thin they are easily handled and are adapted to assume any particular configuration and to take on a high finish in the form of a polish, plating or pointing so as to give any desired ornamental effect to enhance the general appearance of the vehicle.

In order to facilitate centering of part 13 of the cover structure with respect to body part 6, portions of both the body part and part 13 are correspondingly stepped and clamped in nested relationship, as indicated, which also facilitates alignment of the holes formed in parts 6 and 13 through which bolts 8 extend. Suitably recessed portions are provided on part 13 for seating the tapered head portions of bolts 8.

Part 13 is so shaped as to be placed under tension when clamped to body part 6 by bolts 8 so that the periphery thereof will be resiliently held in relatively tight engagement with a rounded portion of the outer surface of a flange of rim 1, as shown and overhang the lowermost flange portion of rim 1. The surface adjacent the periphery of part 13 forms substantially a continuation of the surface of the side wall of the tire to afford for example a white side wall effect for the tire. Valve stem 3 will not, therefore, project too far outside of part 13 and yet is readily accessible without the need of disturbing the cover on the wheel.

The inner peripheral portion of ring part 12 has an inturned flange portion which is tightly interlocked with a reversely turned flange portion at the periphery of part 13. The outer periphery of part 12 is spaced from the peripheral edge of rim 1 but not sufficiently to expose such edge other than could be observed by viewing from a point adjacent the side wall of the tire. Such spacing prevents the peripheral portion of ring part 12 from rattling against the edge of rim 1, particularly since part 12 is generally made quite thin and is relatively flexible. An outstanding advantage of having the curved flange portion of rim 1 instead of the peripheral edge of the rim serve as the bearing surface for the peripheral portion of part 13 is that such rounded portion is generally formed, in large scale manufacture, with closer tolerance than the edge of the rim and is therefore more apt to form a better fit and a continuous circle of contact with periphery of part 13 yieldably held thereagainst, thereby effectively keeping out dirt and debris. Furthermore, since part 13 is generally made more rigid than part 12 a greater amount of tension will be exerted thereby against the rim than that if part 12 were in contact instead. Such engagement also automatically compensates for slight manufacturing variations in the construction of the wheel parts. In addition, the tensioning of part 13, by means of such engagement between the periphery of part 13 and side of the rim, results in application of pressure on the bolts 8 to prevent these bolts from becoming loose during usage of the vehicle. Lock washers or similar devices, hence, are not necessary for the proper securement of bolts 8.

Cover part 13 is provided centrally thereof with a curved or rib portion 15 extending laterally outwardly and circularly about the wheel axis. A plurality of springs, or spring clips, such as 16, having a shape similar to that of a numeral 7, are secured and evenly spaced along the inner periphery of curved portion 15 by rivets, such as 17, or other suitable fastening means. The free end of spring 16 is shaped so as to provide a yieldable cam-like surface for detachably holding an inturned bead portion 18 of the hub cap 14 making it more difficult to remove the hub cap than to apply it. Sufficient clearance is provided radially outwardly between bead portion 18 and the adjoining portion of cover part 13 to allow reception of the end of a pry-off tool, or perhaps the fingers of the serviceman, for prying off the hub cap 14 from the remainder of the cover structure.

It will thus be apparent that the cover proper is dished so as to telescope an indentation in the wheel body and also to accommodate an outer margin of a hub cap retained in place by spaced spring clips carried by the cover or trim. Also the cover carries an outer ornamental bead and has a central stepped portion detachably bolted to the wheel body, the bolts being accessible upon removal of the snap-on hub cap.

In addition the outer bead well conceals the curled outer tire rim edge but does not bear against that edge or the tire which is in close proximity thereto. Further the central stepped portion of the cover enables the cover to be self centering on the wheel with a main bearing point on the wheel body. The cover, however, does bear on one of the stepped flanges of the rim so that the main part of the cover is at such a distance from the junction of the rim and body parts as to yet enable the valve stem to project far enough through the cover to be readily accessible. The bolts in being tightened will clamp under tension the cover to the wheel and hold it from rattling.

The outer bead while spaced from the outer rim edge is of such extent as to still conceal from view this edge without bearing against same.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a wheel cover structure for a wheel including a body part and a flanged rim part supporting a tire, a cover comprising a circular outer portion for disposition over the rim and body parts and having a central portion in nested relationship with the center of the body part and including an intermediate rib portion extending circularly and axially outwardly about the wheel axis, and a plurality of hub cap retaining spring clip members secured to the radially inner side of the rib portion and extending generally axially outwardly and radially outwardly over the rib portion and having hub cap retaining shoulders disposed at the radially outer side of the rib portion for receiving the edge of a hub cap member concealingly disposed over the center of the body part and said rib portion.

2. In combination in a cover structure for disposition at the outer side of a wheel including a body part and a tire rim part, a circular cover portion arranged to extend into concealing relation to the tire rim and to the adjacent portion of the wheel body, a rib at the outer side of the cover member, a spring clip carried by said rib and having a flexible retaining portion directed generally radially outwardly, and a second circular cover member having an expanse to lie in concealing relation to said rib and said clip and having the radially outer margin thereof retainingly engaged by said flexible portion of the clip.

3. A cover structure for disposition at the outer side of a vehicle wheel and comprising a pair of circular cover members, one of which is of smaller diameter than the other and has the margin thereof formed with a reinforcing and attaching bead and turned under and inwardly, the larger of said cover members having an annular outwardly protruding rib thereon of a diameter smaller than the beaded margin of the smaller cover member, and spring clips secured to said larger cover member in radially inward relation to said rib and having resilient retaining loop portions extending over said rib and engaging with said marginal bead of the smaller cover member retainingly and holding said marginal bead in retained relation at the radially outer side of said rib.

GEORGE ALBERT LYON.

REFERENCES CITED

The following references are of record in the file of this patent:

UNITED STATES PATENTS

| Number | Name | Date |
|---|---|---|
| D. 141,497 | Lyon | June 5, 1945 |
| 1,234,387 | Pugh et al. | July 24, 1917 |
| 2,011,326 | Sinclair | Aug. 13, 1935 |
| 2,016,395 | Sinclair | Oct. 8, 1935 |
| 2,101,318 | Lyon | Dec. 7, 1937 |
| 2,166,216 | Lyon | July 18, 1939 |
| 2,183,220 | Horn | Dec. 12, 1939 |
| 2,214,746 | Lyon | Sept. 17, 1940 |
| 2,333,626 | Aske | Nov. 9, 1943 |